United States Patent
Tao et al.

(10) Patent No.: US 8,421,419 B2
(45) Date of Patent: Apr. 16, 2013

(54) ANTIFERROELECTRIC CAPACITOR-ENABLED POWER CONVERTER

(75) Inventors: Fengfeng Tao, Clifton Park, NY (US); Yang Cao, Niskayuna, NY (US); Daniel Qi Tan, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 752 days.

(21) Appl. No.: 12/570,814

(22) Filed: Sep. 30, 2009

(65) Prior Publication Data

US 2011/0074361 A1 Mar. 31, 2011

(51) Int. Cl.
*H02J 7/00* (2006.01)
*H02J 1/10* (2006.01)
*G05F 5/00* (2006.01)
*H01G 4/06* (2006.01)

(52) U.S. Cl.
USPC ............. 320/137; 320/138; 320/139; 307/44; 307/109; 323/208; 361/15; 361/311; 361/305

(58) Field of Classification Search .................... 320/137
See application file for complete search history.

(56) References Cited

U.S. PATENT DOCUMENTS

| | | | |
|---|---|---|---|
| 3,321,696 A | | 5/1967 | Zenmon Abe et al. |
| 3,996,495 A | | 12/1976 | Herman |
| 5,825,639 A | * | 10/1998 | Wagoner .................... 363/39 |
| 6,141,228 A | * | 10/2000 | Maurio ..................... 363/56.05 |
| 6,369,461 B1 | * | 4/2002 | Jungreis et al. ................. 307/46 |
| 6,549,437 B1 | * | 4/2003 | Takeuchi et al. ............... 363/59 |
| 2005/0046387 A1 | * | 3/2005 | Aker et al. .................... 320/125 |
| 2005/0052165 A1 | * | 3/2005 | Willner et al. ................ 323/266 |
| 2005/0052896 A1 | * | 3/2005 | Kang ............................ 365/145 |
| 2005/0213280 A1 | * | 9/2005 | Azrai et al. ................... 361/271 |
| 2009/0207555 A1 | | 8/2009 | Hackenberger et al. |

OTHER PUBLICATIONS

Ma, Beihai; Kwon, Do-Kyun; Narayanan, Manoj; (Balu) Balachandran, U., "Fabrication of antiferroelectric PLZT films on metal foils", Materials Research Bulletin, v 44, n 1, pp. 11-14, Jan. 8, 2009, pub. Elsevier Ltd.

Baginsky, L.L.; Kostsov, E.G., "Linear electrostatic micromotor on the basis of ferroelectric ceramics", Ferroelectrics, v 320, pp. 141-148, 2005, pub. Taylor and Francis Inc.

Campbell, Colin Kydd; Van Wyk, Jacobus Daniel; Chen, Rengang, "Experimental and theoretical characterization of an antiferroelectric ceramic capacitor for power electronics", IEEE Transactions on Components and Packaging Technologies, v 25, n 2, pp. 211-216, Jun. 2002.

Laudebat, L; Bley, V.; Lebey, T.; Schneider, H.; Tounsi, P., "In situ characterization of non linear capacitors", EPJ Applied Physics, v 14, n 2, pp. 107-114, May 2001, pub. EDP Sciences.

* cited by examiner

*Primary Examiner* — Yalkew Fantu
(74) *Attorney, Agent, or Firm* — Ann M. Agosti

(57) ABSTRACT

A power converter utilizes one or more nonlinear composite film capacitors constructed solely of polymer anti-ferroelectric (AFE) particle composites and configured as DC-link bus capacitors providing an energy buffer to reduce DC-link voltage ripple.

20 Claims, 3 Drawing Sheets

ANTIFERROELECTRIC CAPACITOR-ENABLED POWER CONVERTER

BACKGROUND

Figure 1:
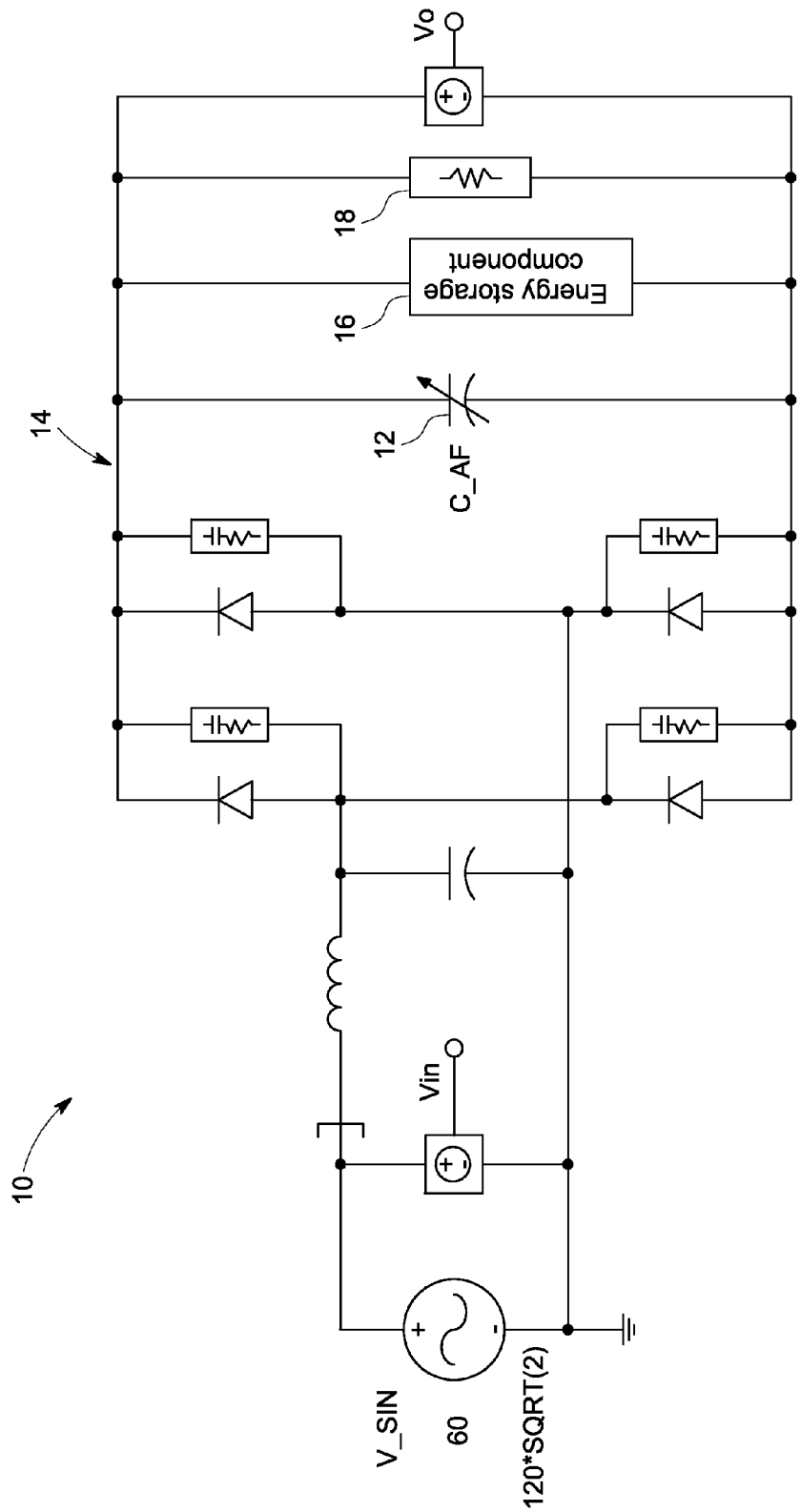

The invention relates generally to electronic power conversion and more particularly to a power converter using nonlinear composite film capacitors constructed from polymer anti-ferroelectric (AFE) particle composites as energy storage components.

The task of power converters utilizing power electronics technology generally is directed to processing and controlling the flow of electric energy by supplying voltages and currents in a form that is optimally suited for user loads. Power electronics is recognized as a significant technology propelling many critical areas of technology such as, without limitation, telecommunications, computers, automation and process control, robotics, transportation, and all forms of environment-friendly energy conversion.

One major factor associated with power converter design relates to the selection of available high power density components. Power capacitors permit electrical energy to be stored over a long time period and released as required in a controlled manner, and thus are regarded as major passive components used in power converters. User-driven requirements for such capacitors may include, for example, electrical characteristics such as capacitance, voltage rating, current handling rating, parasitic behaviors such as equivalent series resistance (ESR), equivalent series inductance (ESL), etc. User-driven requirements may further include, for example, mechanical characteristics such as size, shape, and weight. Environmental characteristics may also be considered. Environmental characteristics may include, for example, temperature range, vibration, life expectancy, etc.

The most frequently used capacitor technologies in modern power converters include electrolytic capacitors and electrostatic capacitors (ceramic and polymer film). Electrolytic capacitors offer the highest capacitance value and appear to be the likeliest choice for low-voltage high-current circuits. Electrolytic capacitors are however, limited in use due to power inefficiency (large ESR), lower operation frequency (large ESL), and limited temperature range. Electrostatic capacitors however, offer very good high frequency performance due to low ESR and low ESL, but are generally limited in use due to low capacitance values. Ceramic capacitors tend to crack due to mechanical stress which is the primary failure mode associated with use of ceramic material(s). Local failure(s) caused by defects in fabrication processes may induce catastrophic failures of ceramic capacitors.

Power converter input voltage is generally in the form of a 50 Hz or 60 Hz singe wave AC voltage provided by an electric utility that is first converted by the power converter to a DC-link voltage. The instantaneous input power generally contains large pulsation components while the output power is usually constant for most applications. The power is generally unbalanced over half the line cycle. This unbalanced power has to be stored in an energy storage element such as a capacitor. Since the DC-link voltage should be as ripple free as possible, bulk capacitors are required on the DC side. Studies have shown that more than 40% of a power converter volume is associated with the power converter capacitor elements.

In view of the foregoing, it would be advantageous to provide a power converter having capacitive storage elements that consume substantially less than 40% of the overall power converter volume, while simultaneously improving high frequency performance, reducing temperature rise characteristics or increase in operational temperatures, and increasing functionality of voltage clamping capability beyond that achievable with power converters that employ conventional electrolytic and/or electrostatic storage capacitors. It would also be advantageous if the capacitive storage elements provided mechanical reliability and coercive field strength levels not achievable with ceramic capacitors or capacitors using ceramic materials.

BRIEF DESCRIPTION

Briefly, in accordance with one embodiment, a power converter comprises at least one nonlinear composite film capacitor constructed solely of polymer anti-ferroelectric particle composites, the at least one nonlinear composite film capacitor configured as a DC-link bus capacitor to provide an energy buffer reducing DC-link voltage ripple.

According to another embodiment, a power converter comprises:

a DC-link bus comprising at least one nonlinear composite film capacitor constructed solely of polymer anti-ferroelectric particle composites configured as an energy buffer to reduce DC-link voltage ripple; and at least one electrolytic capacitor, wherein the at least one composite film anti-ferroelectric DC-link bus capacitor and the at least one electrolytic capacitor are together configured to further reduce the DC-link voltage ripple and further configured to reduce ESL and ESR to increase high frequency power converter performance.

According to yet another embodiment, a power converter comprises:

a DC-link bus comprising at least one nonlinear composite film capacitor constructed solely of polymer anti-ferroelectric particle composites and configured as an energy buffer to reduce DC-link voltage ripple; and at least one film capacitor, wherein the at least one anti-ferroelectric DC-link bus capacitor and the at least one film capacitor are together configured to increase high frequency and low frequency power converter performance.

According to still another embodiment, a power conversion system comprises:

a battery; and a power converter configured to provide a charging/discharging current to the battery, the power converter comprising a DC-link bus comprising at least one nonlinear composite film capacitor constructed solely of polymer anti-ferroelectric particle composites, the at least one nonlinear composite film capacitor configured as an energy buffer to reduce DC-link voltage ripple seen by the battery such that at least one of battery longevity and battery power density are increased beyond that achievable via a power converter devoid of nonlinear composite film capacitors constructed solely of polymer anti-ferroelectric particle composites.

According to still another embodiment, a power conversion system comprises:

fuel cells; and a power converter configured to use energy stored in fuel cells, the power converter comprising a DC-link bus comprising at least one nonlinear composite film capacitor constructed solely of polymer anti-ferroelectric particle composites, the at least one nonlinear composite film capacitor configured as an energy buffer to reduce DC-link voltage ripple seen by the fuel cells such that at least one of fuel cells longevity and fuel cells power density are increased beyond that achievable via a power converter devoid of nonlinear composite film capacitors constructed solely of polymer anti-ferroelectric particle composites.

According to still another embodiment, a power conversion system comprises:
  a flywheel; and
  a power converter configured to utilize energy stored in a flywheel, the power converter comprising a DC-link bus comprising at least one nonlinear composite film capacitor constructed solely of polymer anti-ferroelectric particle composites, the at least one nonlinear composite film capacitor configured as an energy buffer to reduce DC-link voltage ripple seen by the flywheel such that at least one of flywheel longevity and flywheel power density are increased beyond that achievable via a power converter devoid of nonlinear composite film capacitors constructed solely of polymer anti-ferroelectric particle composites.

DRAWINGS

Figure 2:
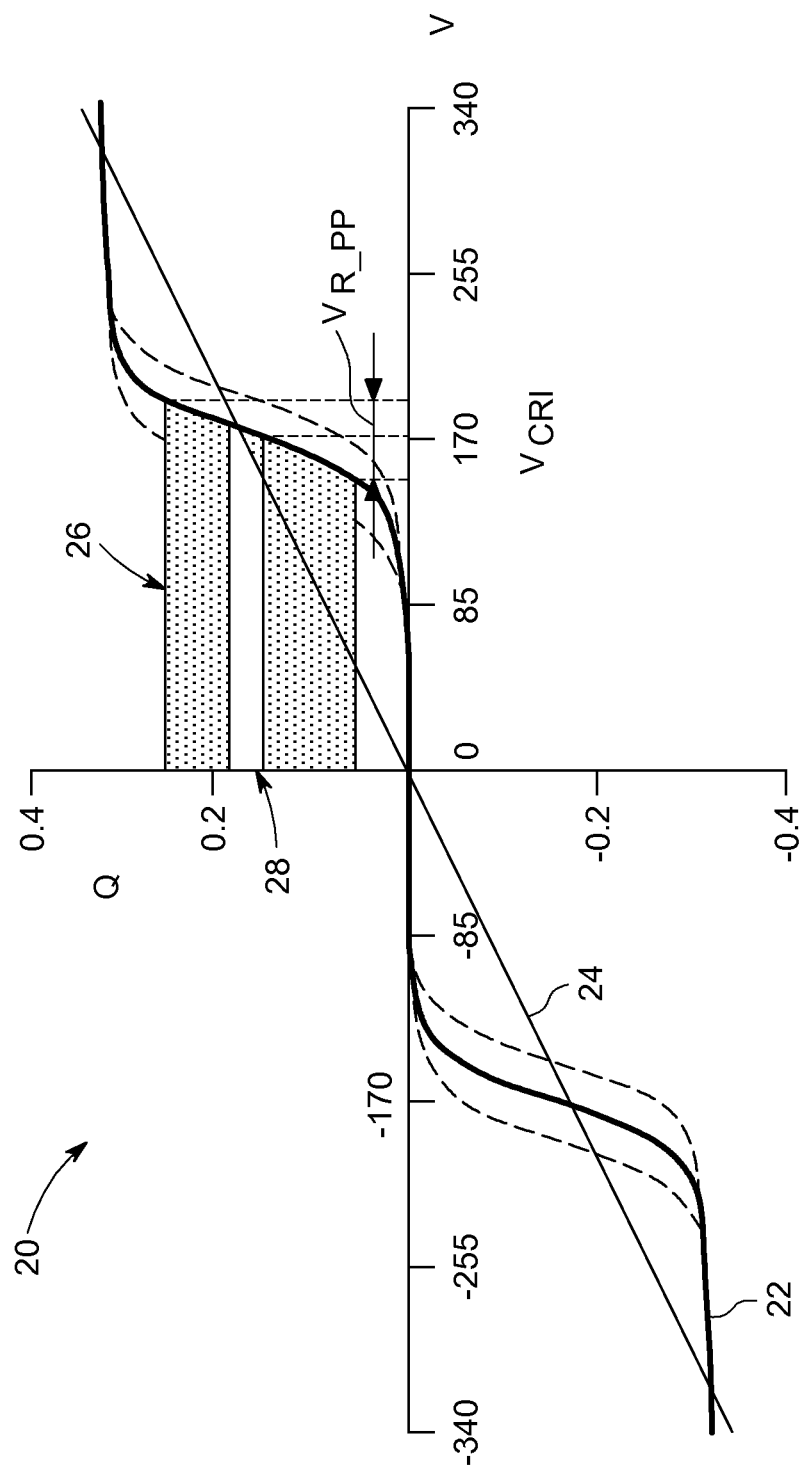
Figure 3:
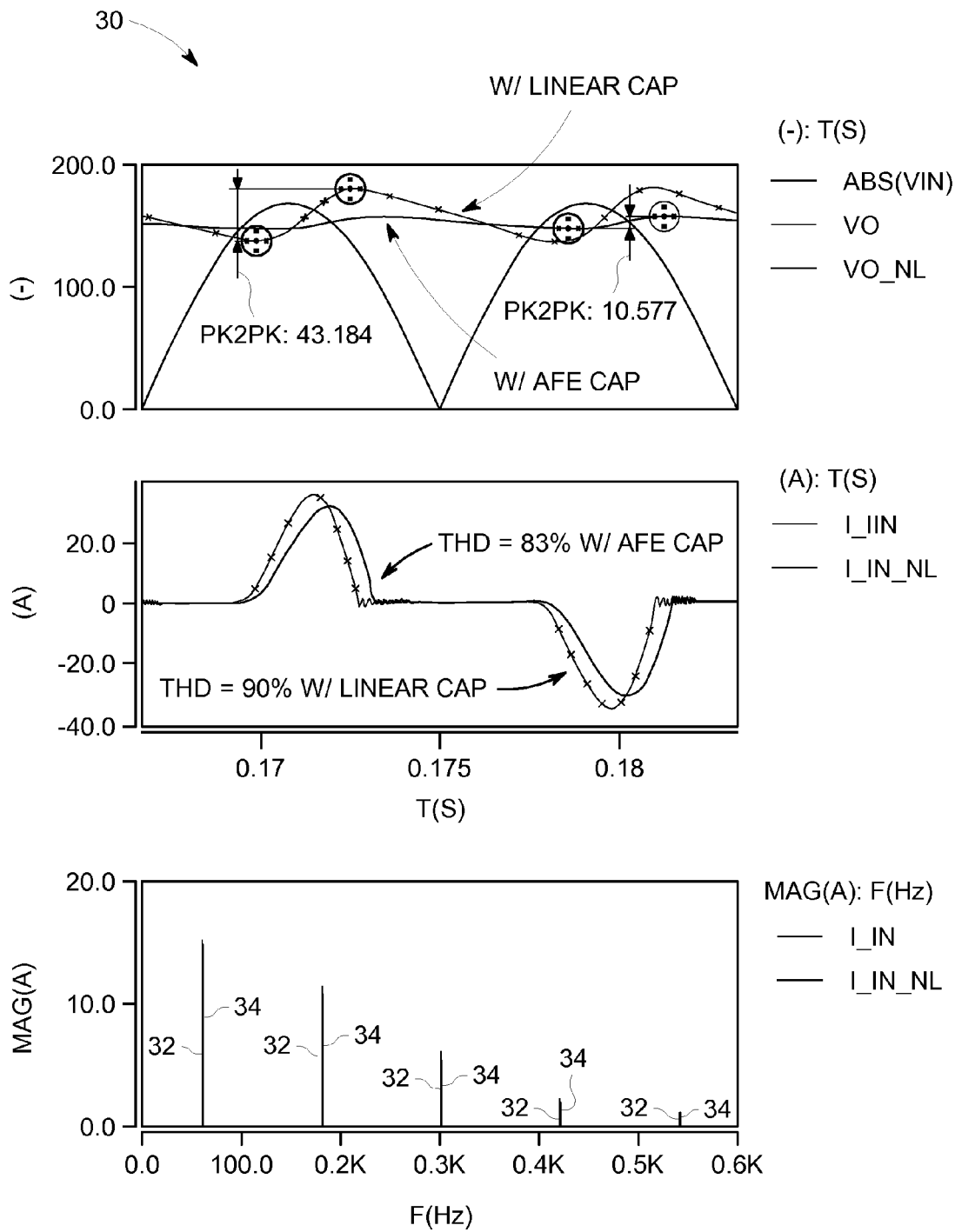

These and other features, aspects, and advantages of the present invention will become better understood when the following detailed description is read with reference to the accompanying drawings in which like characters represent like parts throughout the drawings, wherein:

FIG. 1 is a circuit diagram illustrating a power converter with a nonlinear composite film capacitor constructed solely of polymer anti-ferroelectric (AFE) particle composites according to one embodiment;

FIG. 2 is a graph comparing energy handling capability characteristics for a typical AFE capacitor versus a linear capacitor in response to a range of operational voltages and ripple voltages; and FIG. 3 is a graph of simulation results illustrating improvements in ripple voltage and total current harmonic distortion reduction with an AFE capacitor operating near critical coercive field versus a linear capacitor.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

The embodiments and principles described herein were discovered by the present inventors to be useful in substantially reducing the volume of a power converter while simultaneously improving the power converter reliability. A short discussion about particular aspects of capacitors is first set forth below to provide a better understanding of the embodiments and principles described herein with reference to the figures.

Conventional DC-link capacitors typically have fixed capacitance values with nominally low values of relative dielectric permittivity around 100, which results in fairly low energy densities. The capacitance C of a parallel-plate capacitor is given, for example, by $C = \overset{\circ}{k}0 \overset{\circ}{k} rA/d$, where $\overset{\circ}{k}0$, $\overset{\circ}{k}r$, A and d are permittivity of free space, relative dielectric permittivity of the contained dielectric, plate area and plate separation, respectively. Low relative dielectric permittivity for a given capacitance means large capacitance volume. The energy handling capability of a capacitor is not only related to the capacitance, but also to how thorough the energy stored can be released. For a linear capacitor, energy handling capability is represented by $delt\_E = 2C*Vr\_pp*Vdc$ where C, Vr_pp, and Vdc are capacitance, ripple peak-to-peak voltage and DC-link voltage respectively. The energy density of conventional capacitors is therefore low.

In contrast, AFE capacitors employ much higher dielectric permittivity materials. The present inventors recognized the nonlinear behavior of AFE capacitors around the critical coercive field makes energy store and release more thoroughly without large voltage variations, a feature particularly useful in power converter design. The ideal energy handling capability approaches $qs*Vdc$, where qs is the charge stored near saturation polarization. AFE capacitors also offer improved high frequency performance with reduced ESR and ESL so that power converters can be operated at much higher operational frequencies resulting in further reduction in overall size, another feature recognized by the present inventors as useful in power converter design. The foregoing features were recognized by the present inventors as useful to improve power conversion system reliability.

Studies have shown that electrolytic capacitors are significant life-limiting components in power converters due to elevated operating temperatures. The use of AFE capacitors in power converters were recognized by the present inventors to result in lower temperature rise characteristics such that power converter operational temperatures can be higher without reliability penalties.

FIG. 1 is a circuit diagram illustrating a power converter 10 with an anti-ferroelectric (AFE) capacitor 12 energy storage element, according to one embodiment. AFE capacitor 12 is a nonlinear composite film capacitor constructed solely of polymer anti-ferroelectric particle composites. As such, catastrophic failure modes generally associated with ceramic capacitors and capacitors constructed from ceramic materials are substantially eliminated. Power converter 10 may utilize the phase transition of one or more AFE capacitors 12 between corresponding AFE and ferroelectric (FE) states so that a significant increase of power density and fast power release can be realized. This feature is particularly useful to providing an energy storage element for size/weight reduction and performance improvement. More specifically, the nonlinear composite film capacitor 12 constructed solely of polymer anti-ferroelectric particle composites advantageously utilizes the increase in dielectric constant k with increasing electric field. The nonlinear composite film capacitor 12 could be used in conjunction with another linear energy storage component 16, such as, but not limited to, an electrolytic capacitor, a film capacitor, a battery, a fuel cell, or a flywheel etc. Although the dielectric constant k of some AFE capacitors changes with temperature, this feature is not useful to achieving the size, weight and performance gains in accordance with the principles described herein.

The use of nonlinear composite film capacitors constructed solely of polymer anti-ferroelectric particle composites 12 was found to eliminate shortcomings associated with conventional capacitors such as degradation in capacitance and leakage current at higher operational temperatures and frequencies, low ripple current handling capacity, and reliability issues. The use of such AFE capacitor(s) 12 in power converter structures was found to be advantageous in suppressing ripple voltages and transient voltages or current surges because of the nonlinear increase in capacitance with increases in voltage generally associated with use of conventional capacitors.

With continued reference to FIG. 1 and FIG. 2, AFE capacitor 12 is placed on the DC-link side 14 of power converter 10. The DC-link voltage is designed near to or in the vicinity of the critical coercive field of the AFE capacitor 12 where a fairly abrupt increase of polarization of the AFE capacitor 12 occurs due to the phase transition induced by the unbalanced power between input and output. This configuration was found to effectively absorb and release energy to reach the power balance with lowest possible DC-link voltage variation by maximizing the usage of nonlinearity and high dielectric permittivity of the AFE capacitor material(s).

AFE capacitor 12 is used as an energy storage element, as it would be used in single-phase/three phase, diode rectifier or power factor correction circuits, or any power converters where energy storage is required or desired. Power converter 10 is depicted as a simple single-phase diode bridge rectifier with an equivalent load resistor 18. An output inverter/converter is not shown in favor of enhancing an understanding of the principles described herein with reference to only the DC-link 14.

FIG. 2 is a graph 20 comparing simulated energy handling capability characteristics for a typical AFE capacitor versus a linear capacitor in response to a range of operational voltages and ripple voltages. The simulation model employed to generate the graph was developed for a typical anti-ferroelectric polarization characteristic. Curve 22 represents the AFE capacitor polarization characteristic, while straight line 24 represents the QV characteristic for a 1000 uF linear capacitor. The respective areas 26, 28 enclosed by the QV curves 22, 24 represent the energy handling capability of the capacitors. It can be seen that the energy handling capability of the nonlinear AFE capacitor is substantially higher than that of the linear capacitor under identical voltage and ripple voltage conditions.

FIG. 3 is a set of graphs 30 of simulation results illustrating improvements in ripple voltage and total current harmonic distortion reduction with an AFE capacitor operating near critical coercive field versus a linear capacitor. These results were achieved using a 1 kW load. It can be seen that the AFE capacitor achieves a much lower ripple voltage when operating near critical coercive field than that which is achievable when using a linear capacitor. It can further be seen that the AFE capacitor reduces input current total harmonic distortion below that achievable when using a linear capacitor. Total harmonic distortion was reduced from 90% to 83% for the instant case as represented by the middle and bottom graphs in FIG. 3. The taller left-side vertical lines 32 depicted in the bottom graph of FIG. 3 show that the total harmonic distortion of the input current with respect to frequency when using an AFE capacitor 12 is less than the total harmonic distortion of the input current with respect to frequency when using a linear capacitor as represented by the shorter right-side vertical lines 34.

In summary explanation, a power converter 10 utilizes one or more nonlinear composite film capacitors constructed solely of polymer anti-ferroelectric particle composites as energy storage components on the DC-link side of the power converter. The DC-link voltage is set near the vicinity of the critical coercive field of the AFE capacitor(s) where a fairly abrupt increase of polarization of the capacitor(s) occurs due to the phase transition induced by the unbalanced power between the power converter 10 input and the DC-link 14 output. The configuration effectively absorbs and releases energy to reach the power balance with lowest possible DC-link voltage variation by maximizing the usage of nonlinearity and high dielectric permittivity of the AFE material(s).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power converter comprising at least, a battery and configured to provide charging current to the battery, one nonlinear composite film capacitor constructed solely of polymer anti-ferroelectric (AFE) particle composites, the at least one nonlinear composite film capacitor configured as a DC-link bus capacitor to provide an energy buffer reducing DC-link voltage ripple.

2. The power converter according to claim 1, further comprising at least one electrolytic capacitor, wherein the at least one nonlinear composite film capacitor and the at least one electrolytic capacitor are together configured to further reduce the DC-link voltage ripple and further configured to reduce equivalent series inductance and equivalent series resistance to increase high frequency power converter performance.

3. The power converter according to claim 1, further comprising at least one ceramic or film capacitor, wherein the at least one nonlinear composite film capacitor and the at least one ceramic or film capacitor are together configured to increase high frequency and low frequency power converter performance.

4. The power converter according to claim 1, wherein the power converter is configured to provide a charging current to a battery, and further wherein the at least one nonlinear composite film capacitor is configured to reduce DC-link voltage ripple.

5. The power converter according to claim 1, wherein the DC-link voltage is set in a range between about 70% to about 90% of a critical coercive field voltage strength of the at least one nonlinear composite film capacitor.

6. The power converter according to claim 1, wherein the at least one nonlinear composite film capacitor is further configured to operate in its critical coercive field region in a range between about 50 V/micron-meter to about 150 V/micron-meter to reduce the DC-link voltage ripple.

7. The power converter according to claim 1, wherein the DC-link voltage is set in a range between about +30% and about −30% of a critical coercive field voltage strength of the at least one nonlinear composite film capacitor.

8. A power converter comprising a DC-link voltage bus, the DC-link voltage bus comprising at least one nonlinear composite film capacitor constructed solely of polymer anti-ferroelectric (AFE) particle composites, the at least one nonlinear composite film capacitor AFE capacitor configured to operate in its critical coercive field region to reduce voltage ripple on the DC-link voltage bus; a battery and configured to provide charging current to the battery.

9. The power converter according to claim 8, further comprising at least one electrolytic capacitor, wherein the at least one nonlinear composite film capacitor and the at least one electrolytic capacitor are together configured to further reduce the voltage ripple on the DC-link bus and further configured to reduce equivalent series inductance and equivalent series resistance to increase high frequency power converter performance.

10. The power converter according to claim 8, further comprising at least one ceramic or film capacitor, wherein the at least one nonlinear composite film capacitor and the at least one ceramic or film capacitor are together configured to increase high frequency and low frequency power converter performance.

11. The power converter according to claim 8, wherein the at least one nonlinear composite film capacitor is configured to reduce DC-link voltage ripple for a battery connected to the DC-link voltage bus.

12. The power converter according to claim 8, wherein the DC-link voltage is set in a range between about 70% to about 90% of the critical coercive field voltage strength of the at least one nonlinear composite film capacitor.

13. The power converter according to claim 8, wherein the at least one nonlinear composite film capacitor is further configured to operate in its critical coercive field region in a range between about 50 V/micron-meter to about 150 V/micron-meter to reduce the DC-link voltage ripple.

14. The power converter according to claim 8, wherein the DC-link voltage is set in a range between about +30% and about −30% of a critical coercive field voltage strength of the at least one nonlinear composite film capacitor.

15. A power conversion system, comprising:
a battery; and
a power converter configured to provide a charging current to the battery, the power converter comprising a DC-link bus comprising at least one nonlinear composite film capacitor constructed solely of polymer anti-ferroelectric (AFE) particle composites, the at least one nonlinear composite film capacitor configured as an energy buffer to reduce DC-link voltage ripple.

16. The power conversion system according to claim 15, wherein the DC-link voltage is set in a range between about 70% to about 90% of the critical coercive field voltage strength of the at least one nonlinear composite film capacitor.

17. The power conversion system according to claim 15, wherein the at least one nonlinear composite film capacitor is further configured to operate in its critical coercive field region in a range between about 50 V/micron-meter to about 150 V/micron-meter to reduce the DC-link voltage ripple.

18. The power conversion system according to claim 15, wherein the DC-link voltage is set in a range between about +30% and about −30% of a critical coercive field voltage strength of the at least one nonlinear composite film capacitor.

19. A method of operating a power converter, the method comprising:
configuring at least one nonlinear composite film capacitor constructed solely of polymer anti-ferroelectric (AFE) particle composites as a DC-link bus energy storage capacitor; and
operating the nonlinear composite film capacitor at a DC-link bus voltage in the vicinity of a critical coercive field voltage of the at least one nonlinear composite film capacitor such that DC-link voltage ripple is reduced.

20. The method according to claim 19, wherein the DC-link voltage is set in a range between about 70% to about 90% of the critical coercive field voltage strength of the at least one nonlinear composite film capacitor.

* * * * *